(12) United States Patent
Hankins

(10) Patent No.: US 11,537,963 B2
(45) Date of Patent: Dec. 27, 2022

(54) SYSTEMS AND METHODS FOR DECOMMISSIONING BUSINESS INTELLIGENCE ARTIFACTS

(71) Applicant: Motio, Inc., Plano, TX (US)

(72) Inventor: Lance W. Hankins, Allen, TX (US)

(73) Assignee: Motio, Inc., Plano, TX (US)

( * ) Notice: Subject to any disclaimer, the term of this patent is extended or adjusted under 35 U.S.C. 154(b) by 100 days.

(21) Appl. No.: 15/850,728

(22) Filed: Dec. 21, 2017

(65) Prior Publication Data

US 2018/0121851 A1    May 3, 2018

Related U.S. Application Data

(63) Continuation-in-part of application No. 13/657,753, filed on Oct. 22, 2012, now Pat. No. 9,953,279.

(60) Provisional application No. 61/550,358, filed on Oct. 21, 2011.

(51) Int. Cl.
*G06Q 10/06*    (2012.01)

(52) U.S. Cl.
CPC . *G06Q 10/06313* (2013.01); *G06Q 10/06375* (2013.01); *G06Q 10/06393* (2013.01)

(58) Field of Classification Search
CPC .................................................... G06Q 10/06
See application file for complete search history.

(56) References Cited

U.S. PATENT DOCUMENTS

| | | | |
|---|---|---|---|
| 6,381,558 B1 | 4/2002 | Berry et al. | |
| 6,546,545 B1 | 4/2003 | Honarvar et al. | |
| 6,694,288 B2 | 2/2004 | Smocha et al. | |
| 7,464,123 B2 | 12/2008 | Croker | |
| 7,546,598 B2 | 6/2009 | Blumenthal et al. | |
| 7,885,929 B2 | 2/2011 | Moore, Jr. et al. | |
| 7,945,589 B1 | 5/2011 | Weiss et al. | |
| 8,073,863 B2 | 12/2011 | Rachmiel et al. | |
| 8,140,477 B2 | 3/2012 | Moore, Jr. et al. | |
| 8,285,678 B2 | 10/2012 | Moore, Jr. et al. | |
| 8,571,909 B2 * | 10/2013 | Miller | G06Q 10/00 705/7.11 |
| 8,751,464 B1 | 6/2014 | Weiss et al. | |
| 9,953,279 B1 | 4/2018 | Hankins et al. | |
| 2002/0116152 A1 | 8/2002 | Tanaka | |
| 2004/0138933 A1 | 7/2004 | LaComb et al. | |
| 2006/0010102 A1 | 1/2006 | Labossiere et al. | |
| 2006/0074920 A1 | 4/2006 | Wefers et al. | |
| 2006/0085434 A1 | 4/2006 | Mah et al. | |

(Continued)

OTHER PUBLICATIONS

IBM Corp., "IBM Cognos Administration: Administration and Security Guide (Version 10.1.0)". USA, 2010, pp. 1-1016.

(Continued)

*Primary Examiner* — Kurtis Gills

(74) *Attorney, Agent, or Firm* — Shannon W. Bates; Harper & Bates LLP

(57) ABSTRACT

An automated, multi-stage decommissioning method for business intelligence artifacts may comprise generating a classification for a business intelligence artifact in a business intelligence environment; determining, based on the classification, whether the business intelligence artifact is a target artifact to be decommissioned; and if the business intelligence artifact is determined to be a target artifact, then initiating a decommissioning process on the target artifact.

22 Claims, 4 Drawing Sheets

(56) References Cited

U.S. PATENT DOCUMENTS

| | | |
|---|---|---|
| 2006/0253471 A1 | 11/2006 | Wasserman et al. |
| 2006/0253472 A1 | 11/2006 | Wasserman et al. |
| 2007/0038683 A1* | 2/2007 | Dixon .................... G06Q 10/06 |
| 2007/0047439 A1* | 3/2007 | An ........................ G06Q 10/063 |
| | | 370/231 |
| 2007/0239508 A1 | 10/2007 | Fazal et al. |
| 2007/0282805 A1* | 12/2007 | Janzen ................. G06F 16/217 |
| 2008/0127083 A1 | 5/2008 | Brown et al. |
| 2008/0189332 A1 | 8/2008 | Winter |
| 2008/0228697 A1* | 9/2008 | Adya .................... G06F 16/217 |
| 2009/0043788 A1* | 2/2009 | Averbuch ............ G06F 16/2445 |
| 2009/0069703 A1* | 3/2009 | Takla ..................... A61B 5/318 |
| | | 600/509 |
| 2009/0083717 A1 | 3/2009 | Branson et al. |
| 2009/0271242 A1* | 10/2009 | Stafford ................. G06Q 10/06 |
| | | 705/7.18 |
| 2010/0070448 A1* | 3/2010 | Omoigui ........... H01L 27/14647 |
| | | 706/47 |
| 2013/0097585 A1* | 4/2013 | Jentsch .................... G06F 8/71 |
| | | 717/122 |

OTHER PUBLICATIONS

Motio, Inc., "MotioCI User Guide, (Version 1.4)". USA, Jan. 13, 2009, pp. 1-158.

Motio, Inc. "MotioCI User Guide, (Version 2.0)". USA, Mar. 30, 2010, pp. 1-180.

* cited by examiner

SYSTEMS AND METHODS FOR DECOMMISSIONING BUSINESS INTELLIGENCE ARTIFACTS

CROSS-REFERENCE TO RELATED APPLICATIONS

This application is a continuation-in-part of U.S. application Ser. No. 13/657,753, filed Oct. 22, 2012 and entitled "System and Method for Computer-Assisted Improvement of Business Intelligence Ecosystem", which claims the benefit of U.S. Provisional Patent Application Ser. No. 61/550,358, filed Oct. 21, 2011 and entitled "System and Method for Computer-Assisted Improvement of Business Intelligence Ecosystem", each of which is hereby incorporated by reference for all purposes.

Additionally, this application is related to U.S. application Ser. No. 14/337,144, filed Jul. 21, 2014 and entitled "Supplemental System for Business Intelligence Systems", which claims the benefit of U.S. Provisional Patent Application Ser. No. 61/856,569, filed Jul. 19, 2013 and entitled "Supplemental System for Business Intelligence Systems", each of which is hereby incorporated by reference for all purposes.

BACKGROUND

A Business Intelligence ("BI") environment may comprise many users authoring, executing, and storing countless BI artifacts (reports, dashboards, analyses, models, packages, report templates, etc.), as well as outputs, objects and configurations related to those BI artifacts. Each BI artifact, and its related outputs, objects, and configurations, may be subject to numerous revisions by multiple authors and/or users of the BI environment, and such revisions may also be stored within the BI environment. Over time, this may result in a crowded BI environment with many BI artifacts that may be non-essential, redundant, sub-optimal, invalid, and/or burdensome to maintain.

SUMMARY

The present disclosure relates to systems and methods supplemental to one or more BI systems for monitoring and improving a BI environment to reduce its maintenance footprint through the automated classification and multi-stage decommissioning of non-essential, redundant, sub-optimal, invalid, and/or burdensome BI artifacts.

In some implementations, an automated, multi-stage decommissioning method for BI artifacts may comprise generating a classification for a BI artifact in a BI environment; determining, based on the classification, whether the BI artifact is a target artifact to be decommissioned; and if the BI artifact is determined to be a target artifact, then initiating a decommissioning process on the target artifact.

The details of one or more implementations are set forth in the accompanying drawings and the description below. Other features, objects, and advantages of the implementations will be apparent from the descriptions and drawings.

BRIEF DESCRIPTION OF DRAWINGS

For a more complete understanding of this disclosure and its features, reference is now made to the following description, taken in conjunction with the accompanying drawings, in which.

DETAILED DESCRIPTION

The present disclosure is generally directed to systems and methods supplemental to one or more BI systems for reducing the surface area of a BI environment. According to the present disclosure, the behavior, state, and usage patterns of BI artifacts in a BI environment are monitored to identify target BI artifacts that are deemed non-essential, redundant, sub-optimal, invalid, and/or burdensome to maintain. Then, an autonomous multi-phase decommissioning process is initiated on the identified target BI artifacts (along with any related BI artifact outputs, objects and configurations) to improve maintainability of the BI environment.

A supplemental system (hereinafter, the "SI System") may be communicably coupled to one or more BI environment(s), external database(s), datasource(s), webservice(s), and/or other system(s). In some implementations, the SI System may operate on a separate computer system from the BI environment(s) and/or portions of the SI System may be included in the BI environment (e.g., links to SI operations in a graphical user interface generated by the BI environment). The SI System may be configured to monitor, analyze, verify, test, and improve the contents, configurations, usage and health of one or more BI environments. The SI System may utilize system agents to record and analyze, for example, traffic, activities, resource utilization and requests in a configured BI environment. The SI System may also record changes to the state, configuration, and/or behavior of BI artifacts in a monitored BI environment.

Figure 1:
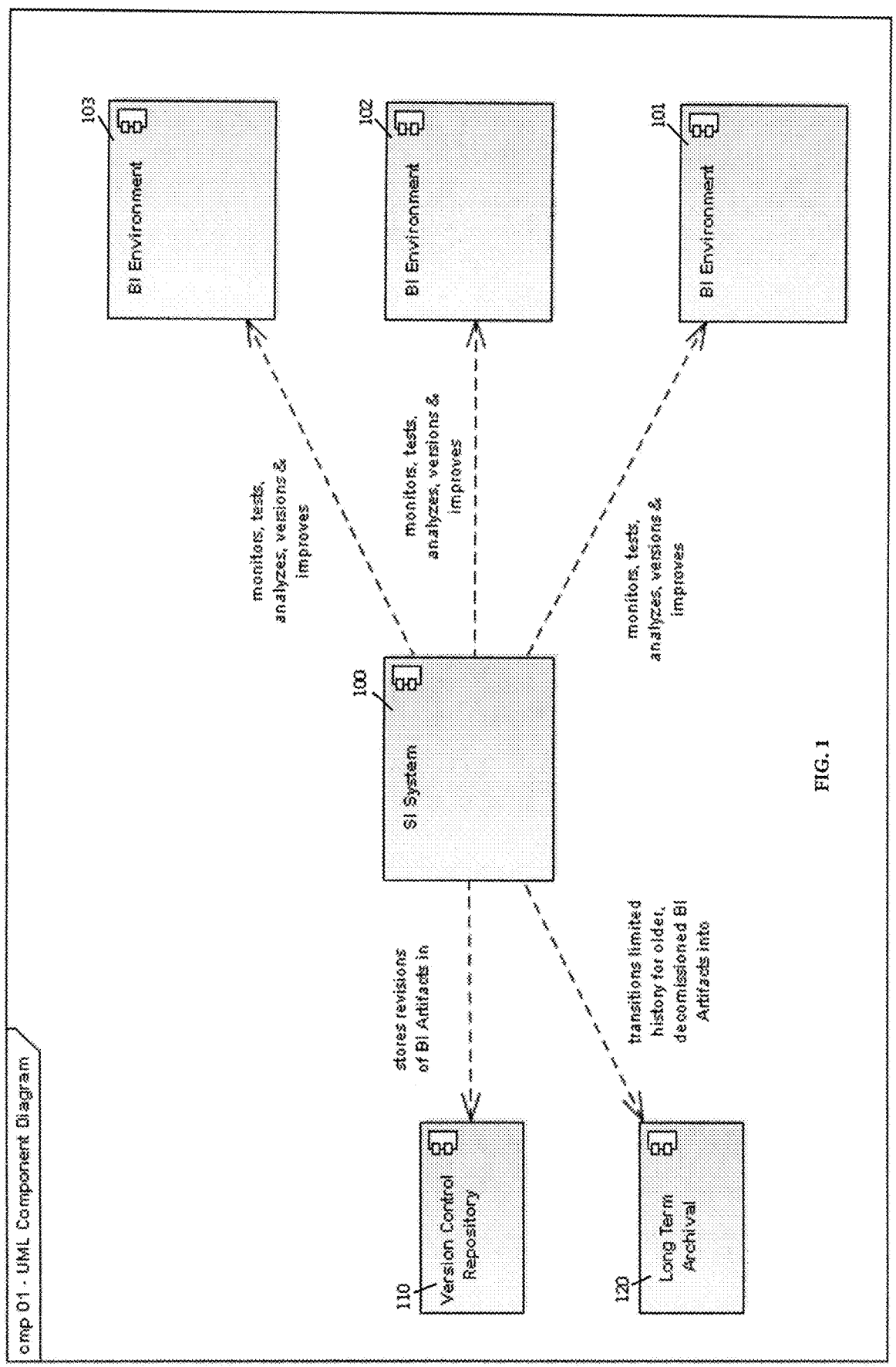
FIG. 1 illustrates a Unified Modeling Language (UML) component diagram depicting the configuration and interactions of a supplemental system ("SI System") with one or more BI environments in accordance with the present disclosure.

Reference is now made to FIG. 1, which shows a UML component diagram depicting the configuration and interactions of SI System 100 with BI Environments 101, 102, 103. As shown in FIG. 1, SI System 100 is configured to monitor, test, analyze, version and/or improve, e.g., a first BI Environment 101, a second BI Environment 102, and a third BI Environment 103. It is noted that FIG. 1 depicts BI Environments 101, 102, and 103 by way of example only, and SI System 100 may be configured to interact with any number, size, or manner of BI Environment(s). With further reference to FIG. 1, SI System 100 may store revisions of BI Artifacts from the monitored BI Environments in Version Control Repository 110. SI System 100 may also transition limited history (such as selected revisions of BI Artifacts) for older, decommissioned BI Artifacts into Long Term Archival 120. In some implementations of the present disclosure, SI System 100 may be configured to utilize external Version Control Repository 110 and/or Long Term Archival 120 components, while in other implementations, the Version Control Repository 110 and/or Long Term Archival 120 components may be provided by and/or integrated into the SI System 100.

Figure 2:
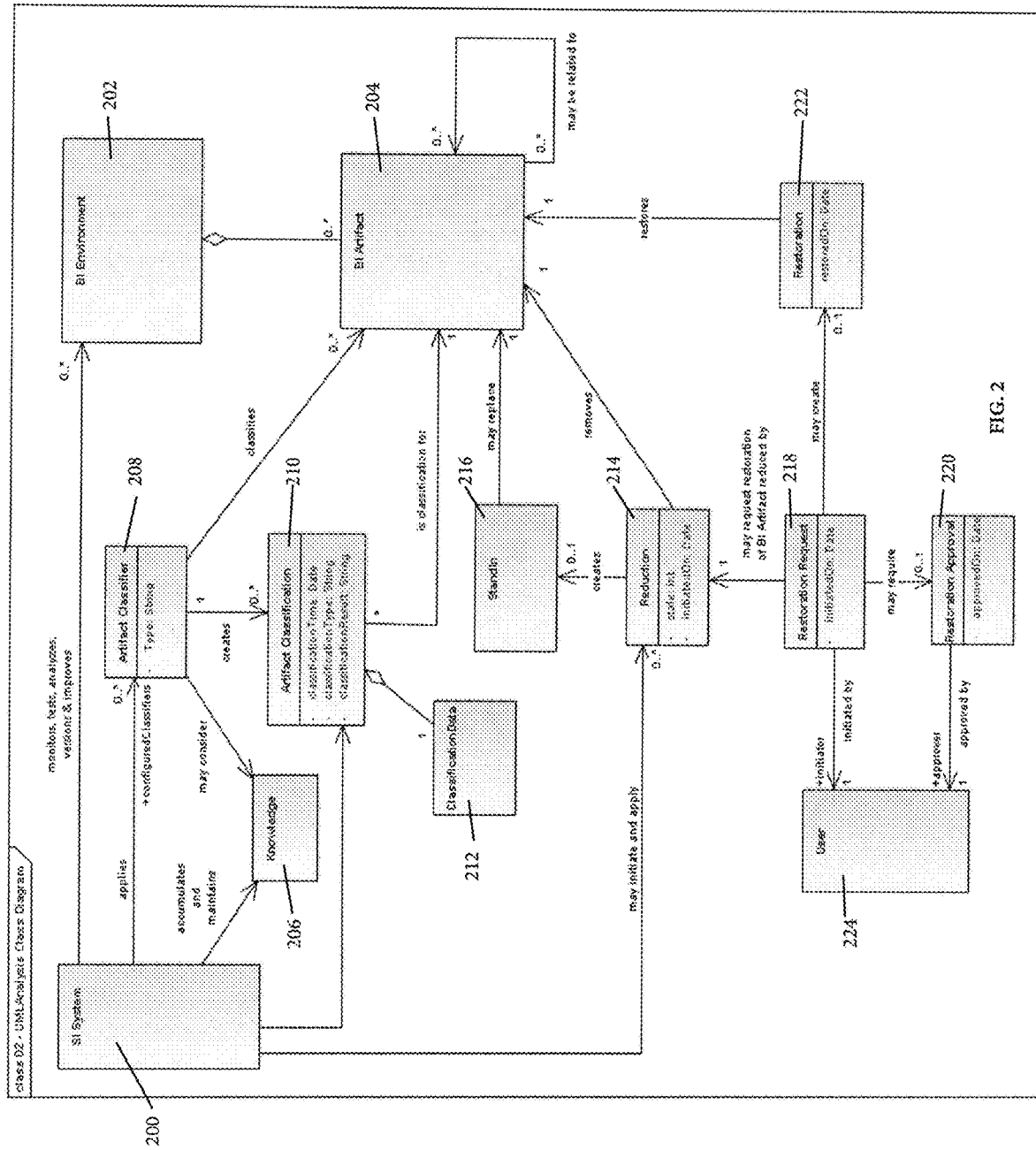
FIG. 2 illustrates a UML analysis class diagram depicting various domain concepts of a SI System in accordance with the present disclosure.

FIG. 2 is a UML analysis class diagram depicting a detailed overview of various domain concepts of a SI System in accordance with the present disclosure. For example, FIG. 2 depicts SI System 200 that monitors, tests, analyzes, versions and/or improves zero or more configured BI Environments 202. BI Environment 202 contains a plurality of BI Artifacts. Each BI Artifact 204 may be related to a plurality of other BI Artifacts. The SI System 200 accumulates and maintains Knowledge 206 about each configured BI Environment 202, the BI Artifacts 204 contained within, their relationships, usage, etc. The SI System 200 may leverage a configured set of Artifact Classifiers 208 to classify each BI Artifact 204. Each Artifact Classifier 208 examines a BI Artifact 204 (along with other related information which may be stored as Knowledge 206 accumulated and maintained by the SI System 200) to create an Artifact Classification 210 specific to the examined BI Artifact 204. Each Artifact Classification 210 represents a classification for a single BI Artifact 204 at a given point in time, and may record additional Classification Data 212. The SI System 200 may be configured to maintain a history of Artifact Classifications.

With further reference to FIG. 2, the SI System 200 may initiate and apply a "Reduction" for any given BI Artifact. The Reduction 214 may remove the BI Artifact 204 from its BI Environment 202 and replace it with a "Stand-In" 216. In some instances, a User 224 may initiate a "Restoration Request" 218. Some Restoration Requests may require Restoration Approval 220 (generally, from another user with authority). An approved and/or applied Restoration Request 218 may create Restoration 222, which restores a previously reduced BI Artifact 204 into its associated BI Environment 202.

Figure 3:
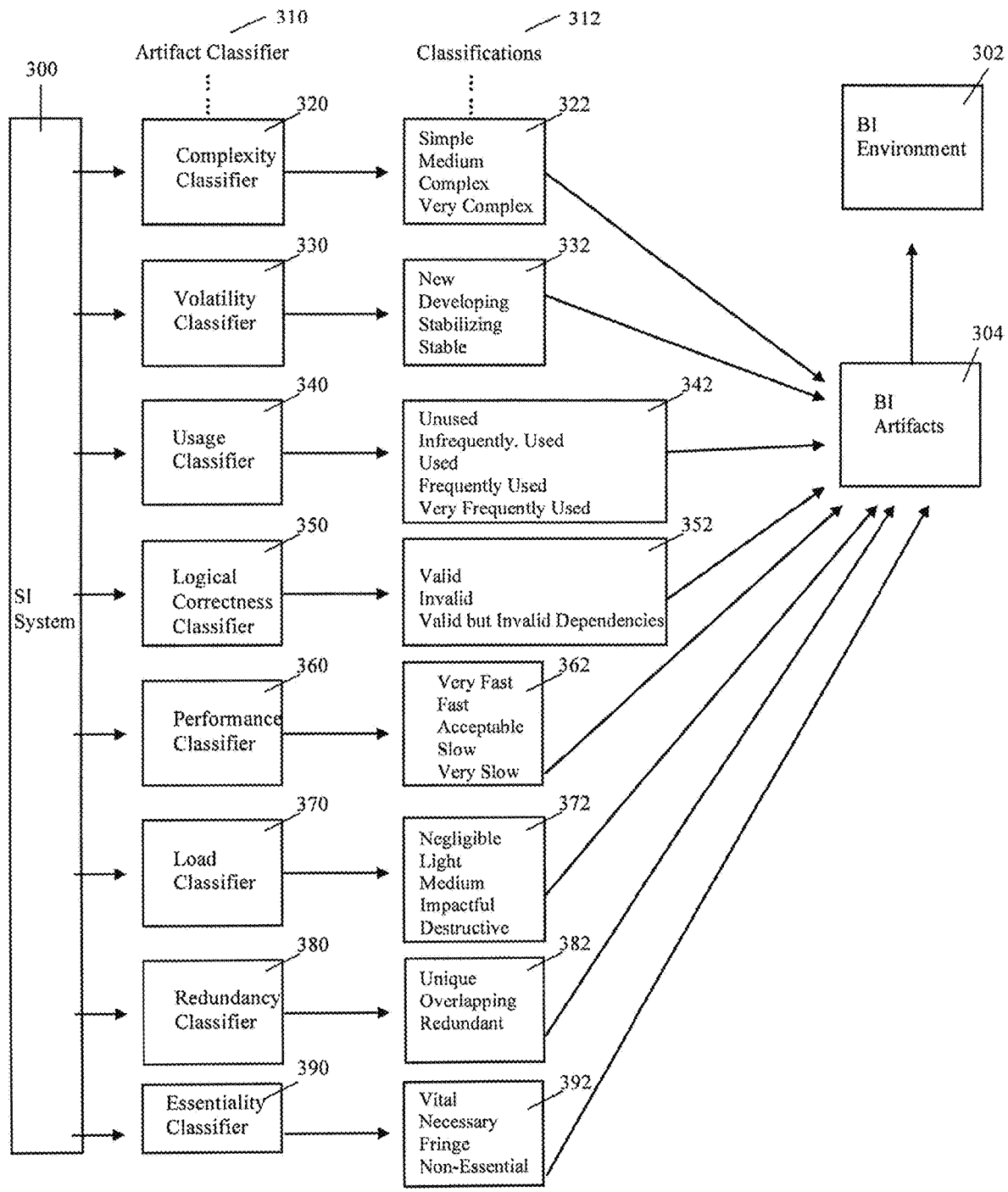
FIG. 3 illustrates exemplary BI artifact classifiers and associated classifications used by the SI System in accordance with the present disclosure.

Reference is now made to FIG. 3, which depicts SI System 300, a monitored BI Environment 302 containing BI Artifacts 304, and exemplary BI Artifact Classifiers 310 along with potential Classifications 312 associated with each BI Artifact Classifier according to the present disclosure. As discussed, the SI System 300 may evaluate and classify BI Artifacts 304 in a monitored BI Environment 302 by utilizing an extensible set of BI Artifact Classifiers 310 to generate Classifications 312. In some implementations, a BI Artifact Classifier 310 may classify a BI Artifact 304 at a given point in time based on the behavior, state, usage, configuration and/or other aspects of the BI Artifact 304, and/or other related BI Artifacts, BI Ecosystem components, BI Ecosystem elements, and/or measurements or recordings made by the SI System 300 or its system agents. In some implementations, one BI Artifact Classifier 310 may consider data from historical classifications made by other BI Artifact Classifiers. By way of example, but not limitation, BI Artifact Classifiers 310 may include the following:

A "Complexity" Classifier 320 may examine the elements of a BI Artifact Specification and classify the BI Artifact 304 into one of the following complexity classifications 322: "Simple," "Medium," "Complex," or "Very Complex".

A "Volatility" Classifier 330 may examine the revision history of a BI Artifact 304 and classify the BI Artifact 304 into one of the following volatility classifications 332: "New," "Developing," "Stabilizing," or "Stable."

A "Usage" Classifier 340 may examine usage information (or a subset of usage information) for a BI Artifact 304 over a configurable time frame and classify the BI Artifact 304 into one of the following usage classifications 342: "Unused," "Infrequently Used," "Used," "Frequently Used," or "Very Frequently Used."

A "Logical Correctness" Classifier 350 may examine verification test results pertaining to a test case conducted by the SI System 300 for a given BI Artifact 304 and classify the BI Artifact 304 with one of the following logical correctness classifications 352: "Valid," "Invalid," or "Valid But Has Invalid Dependencies."

A "Performance" Classifier 360 may examine test results pertaining to a test case conducted by the SI System 300 for a given BI Artifact 304 and classify the test case and related BI Artifact 304 with one of the following performance classifications 362: "Very Fast," "Fast," "Acceptable," "Slow," or "Very Slow."

A "Load" Classifier 370 may examine test results pertaining to a test case conducted by the SI System 300, examination data and/or system agent measurements pertaining to the execution of a given BI Artifact 304 to classify the amount of load that the test case execution places on the BI Ecosystem. For example, the Load Classifier 370 may classify the test case and related BI Artifact 304 into one of the following load classifications 372: "Negligible," "Light," "Medium," "Impactful," or "Destructive."

A "Redundancy" Classifier 380 may examine a set of BI Artifacts along with usage data to classify each BI Artifact in the set with one of the following redundancy classifications 382: "Unique," "Overlapping," or "Redundant."

An "Essentiality" Classifier 390 may examine a set of BI Artifacts along with SI System data that includes historical classifications generated by other SI System Classifiers to classify each BI Artifact in the set with one of the following essentiality classifications 392: "Vital," "Necessary," "Fringe," or "Non-Essential."

Although the SI System 300 may provide an initial set of BI Artifact Classifiers 310, such as those described above, additional BI Artifact Classifiers may be authored and configured for use with the SI System.

In an implementation, the SI System 300 may utilize the extensible set of BI Artifact Classifiers 310 to generate Classifications 312 for BI Artifacts, and may record the classification history for each examined BI Artifact over time in a memory associated with the SI System 300. For example, at time t1, a first BI Artifact is created in a first BI Environment that is configured for use with the SI System. At time t2, the Volatility Classifier of the SI system may classify the first BI Artifact as "New." Between time t2 and time t3, users of the first BI Environment may make, for example, five updates to the first BI Artifact (e.g., by creating five new "revisions" of the first BI Artifact). At time t4, the Volatility Classifier may classify the first BI Artifact as "Developing." Between times t5 and t6, users of the first BI Environment may make, for example, one additional update to the first BI Artifact. At time t7, the Volatility Classifier may classify the first BI Artifact as "Stabilizing." Between times t8 and t9, users of the first BI Environment may make zero updates to the first BI Artifact. At time t10, the Volatility Classifier may classify the first BI Artifact as "Stable."

The SI System may utilize historical BI Artifact Classifications, historical SI System data and/or BI Environment usage data to identify BI Artifacts that may be candidates for decommissioning. For a BI Artifact that has been targeted for decommissioning, the SI System may initiate a multi-phase decommissioning process that leverages an SI System based "stand-in" to safely and gradually reduce the surface area of a configured BI Environment.

In some implementations, the classifications 392 generated by the "Essentiality" Classifier 390 may serve as stimuli for the multi-phase de-commissioning process. For example, a BI Artifact that has been classified with an Essentiality classification 392 of "Non-Essential" over a configured time interval may be targeted for reduction. As time passes, continued classification of the BI Artifact as "Non-Essential" or "Dispensable" may cause the reduced BI Artifact to progress further through the phases of the decommissioning process, while a change in classification to "Fringe" may cause the BI Artifact to exit the reduction process (i.e., be placed back into the live BI Environment).

In some implementations, a classification 392 generated by the "Essentiality" Classifier 390 may be characterized as one of a plurality of classification grades. For example, for a BI Artifact with a first generated classification grade of "Fringe", the classification grade of the target BI Artifact is said to "improve" if a value of a subsequently generated classification grade indicates that the BI Artifact is more essential than the value of the first generated classification grade (e.g., if the subsequently generated classification grade is "Vital" or "Necessary"). An "improvement" in the target BI Artifact's classification grade may cause the BI Artifact to exit the reduction process (i.e., any stand-in is replaced with the BI Artifact in the live BI Environment). Conversely, the classification grade of the target BI Artifact is said to "decline" if a subsequently generated classification grade is a value that indicates the BI Artifact is less essential than the value of the first generated classification grade (e.g., if the subsequently generated classification grade is "Non-Essential"). A "decline", or in some instances a lack of change, in the target BI Artifact's classification grade may cause the BI Artifact to progress further through the phases of the decommissioning process.

In some implementations, the classification history of a first BI Artifact may affect the classification of a second, related BI Artifact. By way of example, but not limitation, in a BI Environment that includes BI Software such as Cognos 11 Analytics instance, a first BI Artifact may be a Cognos package that is configured to provide a semantic layer on top of a first, a second, and a third data source. A second BI Artifact may be a Cognos report that is configured to reference elements from the first BI Artifact (the Cognos package). If, for example, for the preceding six months the "Logical Correctness" Classifier has classified the first BI Artifact with a classification of "Invalid" because it can no longer access the second data source, any attempt to execute the second BI Artifact will fail due to the missing or misconfigured second data source. In other words, the persistent classification of "Invalid" for the first BI Artifact may affect classifications of the second BI Artifact.

Figure 4:
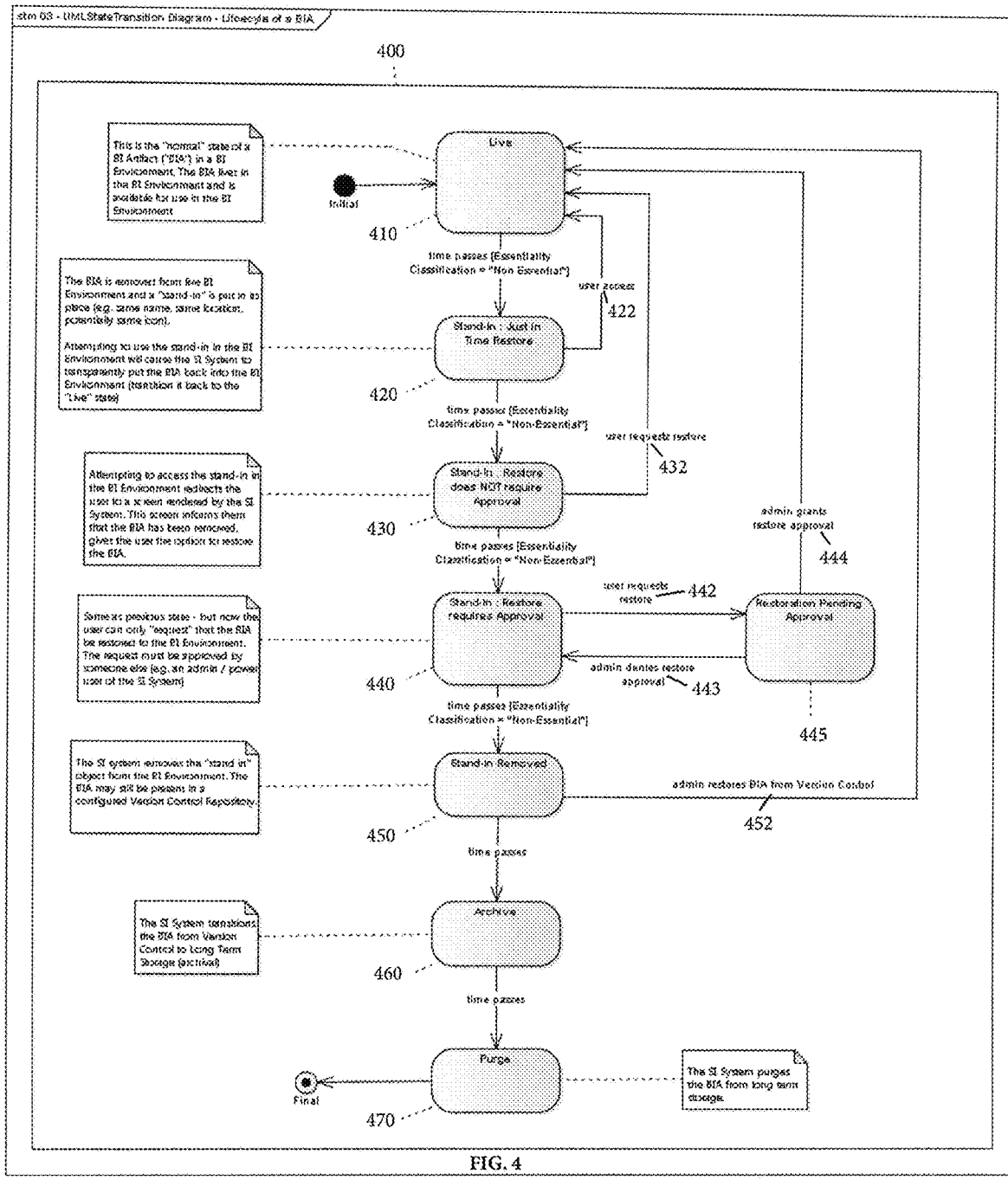
FIG. 4 illustrates a UML state transition diagram of an automated, multi-stage method for decommissioning BI artifacts in accordance with the present disclosure.

Reference is now made to FIG. 4, which depicts a UML state transition diagram of a method 400 according to an implementation of the present disclosure. FIG. 4 depicts the different states that a BI Artifact may progress through when monitored by a SI System. The method 400 involves monitoring a configured BI Environment, leveraging one or more configured BI Artifact Classifiers to classify BI Artifacts deployed within the BI Environment, and then utilizing the historical and present classification information as stimuli to transition a monitored BI Artifact through progressive states of decommissioning or restoration. Although any one or more BI Artifact Classifiers may be used to classify and transition BI Artifacts through the various states of decommissioning, FIG. 4 depicts use of the Essentiality Classifier (which uses the collective data and classifications generated by other BI Artifact Classifiers) to trigger reduction of a BI Artifact. Additionally, although the diagram of FIG. 4 depicts the method 400 for decommissioning one BI Artifact, the diagram is provided for illustration only, and the BI Environment may include any number of BI Artifacts, users, etc.

Referring to block 410 of the method 400 of FIG. 4, a BI Artifact is in a live, "active" state within a BI Environment. In its live/active state, the BI Artifact is deployed within the BI Environment and is readily accessible and available to one or more users in the BI Environment. As long as the BI Artifact is valid, properly functioning, and/or regularly used (i.e., executed, activated, opened, etc.) by one or more users, it will remain in this live, "active" state within the BI Environment. The classifications (including performance, frequency of use, etc.) and classification history required to maintain the BI Artifact in the live, "active" state may be determined by an administrator of the SI System.

At block 420, after a passage of time, the SI System detects that the Essentiality Classifier has classified the BI Artifact as "Non-Essential" for a period of time, thereby targeting the BI Artifact for decommissioning. At block 420, the system may further designate as "Non-Essential" outputs, objects and/or configurations related to the target BI Artifact. In monitoring the BI Environment to designate a BI Artifact and its related outputs, objects and/or configurations as "Non-Essential," the SI System may exclude certain usage activity, including for example activity generated by the SI System itself, activity generated by certain designated users (e.g., quality assurance testers), and/or activity generated by deactivated users.

With continued reference to block 420 of FIG. 4, the target BI Artifact (along with its "Non-Essential" related outputs, objects and/or configurations) is then removed from the live BI Environment and the target BI Artifact is replaced by an SI System generated "stand-in" object in the live BI Environment. At this stage, the SI System has placed the BI Artifact into a "Stand-In: Just-in-Time Restore" state. From the perspective of a user working within the BI Environment, the "stand-in" object may appear identical to the target BI Artifact, bearing the same name and icon image as the original target BI Artifact. Hence, to a user, the "stand-in" object will appear to be the target BI Artifact. In an implementation, the removed target BI Artifact may be stored in the SI System. In other implementations, the removed target BI Artifact may be stored in a separate, parallel BI environment that is exclusively reserved for infrequently-used BI Artifacts. In such implementations, the "stand-in" object in the original BI Environment may link to the BI Artifact in the parallel BI Environment.

At block 420, if a user of the BI Environment attempts to use, execute, or otherwise activate the "stand-in" object, the SI System may transparently place the target BI Artifact back into the live BI Environment, as indicated by arrow 422, and transition its designation from "Non-Essential" to "Active". The SI System will also delete the "stand-in" object. This "just-in-time" restoration of the target BI Artifact back into the live BI Environment allows a user to activate the target BI Artifact without perceiving it was decommissioned or removed from the live BI Environment.

At block 430, if after the passage of a configurable amount of time, the essentiality classification of the target BI Artifact remains "Non-Essential," the SI System may transition the target BI Artifact into a second stage of decommissioning (i.e., the "Stand In: Restore Does Not Require Approval" state). In this state, if a user attempts to use, execute, or activate the "stand-in" object, the BI Environment will redirect the user to a SI System-generated screen that provides an informational prompt indicating the target BI Artifact has been decommissioned and removed from the live BI Environment. Via the SI System-generated screen, the user may view historical information related to the decommissioned target BI Artifact (e.g., its version history, its classification history over time, etc.), as well as outputs, objects and configurations related to the target BI Artifact. The SI System-generated screen may also provide references to other similar and/or related BI Artifacts (e.g., a similar BI Artifact that is still in the "active" state in the BI Environment). The user will then be given the option to restore the target BI Artifact to the live BI Environment. If the user decides to restore the BI Artifact to the live BI Environment, the SI System will place the target BI Artifact back into "Active" status in the live BI Environment, as indicated by arrow 432, and delete the "stand-in" object.

At block 440, if after the further passage of time, the essentiality classification of the target BI Artifact remains "Non-Essential," the SI System may transition the target BI Artifact into a third stage of decommissioning (i.e., the "Stand-In: Restore Requires Approval" state). While in this stage, if a user attempts to use, execute, or activate the "stand-in" object, the BI Environment will redirect the user to a SI System-generated screen that provides an informational prompt indicating the target BI Artifact has been has been decommissioned and removed from the live BI Environment. Via the SI System-generated screen, the user may view historical information related to the decommissioned target BI Artifact, as well as outputs, objects and/or configurations related to the target BI Artifact. The SI System-generated screen may also provide references to other similar and/or related BI Artifacts (e.g., a similar BI Artifact that is still in the "active" state in the BI Environment). The user will then be informed that restoration of the target BI Artifact to the live BI Environment will require administrative approval. As indicated by arrow 442, if the user sends a request for administrative approval to restore the target BI Artifact, the target BI Artifact is transitioned to a "Restoration Pending Approval" state 445 while the target BI Artifact still resides within the SI System. As indicated by arrow 444, if the request for administrative approval is granted, the stand-in object is deleted and the target BI Artifact is returned to the live BI Environment. If the request for administrative approval is not granted, the "stand-in" object will remain in the "Stand In: Restore Requires Approval" state in the live environment. In some implementations, if the request for administrative approval is denied when the user makes the restoration request, the target BI Artifact may be immediately transitioned to the "Stand-In Removed" state described in block 450 below.

At block 450, if after the further passage of time, the essentiality classification of the target BI Artifact remains "Non-Essential," the SI System removes the "stand-in" object from the live BI Environment, and the "stand-in" object is deleted. However, the target BI Artifact remains available in a version control repository maintained and/or utilized by the SI System. As a result, an administrator of the BI environment may restore the target BI Artifact, e.g., upon user request, to the live BI environment, as indicated by arrow 452.

At block 460, after the passage of a pre-determined period of time, which may be set by an administrator of the SI System, the SI System removes the target BI Artifact from the version control repository and places it in a long-term archive. In some implementations, all revisions related to the BI Artifact may be removed from the version control repository and some or all of such revisions may be placed in the long-term archive. At this stage of decommissioning, it is anticipated the target BI Artifact is no longer required by users of the BI Environment. In some implementations, the target BI Artifact and its related BI outputs, objects and/or configurations may only be restored to the live BI Environment under certain conditions set by an administrator of the SI System or through manual intervention by an administrator of the SI System.

At block 470, after the passage of a second pre-determined period of time, which may be set by an administrator of the SI System, the SI system permanently purges the archived BI Artifact and any related BI outputs, objects and/or configurations from the long-term archive.

In the foregoing disclosure of the method of FIG. 4, the various stages of decommissioning were triggered by the passage of time along with the essentiality classification. In other implementations, one or more stages of BI Artifact decommissioning may be triggered by other factors. For example, a BI Artifact may be decommissioned if:

it represents a duplicate or near-duplicate of another BI Artifact;

it has unsatisfied dependencies (e.g., it points to a package or package version that no longer exists, to data sources that are no longer available, etc.);

it has been invalid for a specified period of time (e.g., it has an invalid specification, is configured to utilize an invalid metadata model, or its configured metadata model is configured to use a non-existent, non-functioning or a stale data source);

it is related to a user who has not logged in to the BI Environment for a specified period of time;

it has been failing test execution for a specified period of time;

its schedule credential has been invalid for a specified period of time;

its output has not been viewed for a specified period of time;

it has existed only in a Development BI Environment and was never promoted to Quality Assurance or Production BI Environments;

it has never been run in Quality Assurance or Production BI Environments;

it has remained unedited or at a very low version (e.g., version 1 or 2);

its type is no longer valid in a new version of BI and/or Analytics software (e.g., Cognos, or other similar software known in the art) used by the BI environment;

it is not referenced by any other BI Artifact (may be primarily applicable to certain types of BI Artifacts, such as packages, data sources, etc.);

a related object has been decommissioned;

its owner has been deleted; or only an administrator has access to it.

In one example implementation, the SI System may be used in conjunction with a Cognos Analytics based BI Environment. The SI System may monitor activity in the BI Environment (e.g., usage activity for BI Artifacts) via one or more system agents that observe activity in the BI Environment (for further details on these system agents, see U.S. patent application Ser. No. 13/657,753). By way of example, but not limitation, system agents utilized for a Cognos Analytics BI Environment may monitor activity by inserting themselves into the BI Environment's request flow via a servlet request filter (or other server-side insertion points), by monitoring changes in a configured Cognos audit database and/or by processing Cognos generated log files (via stream processing or via periodic inspection). In some implementations, the SI System may provision stand-in objects into the same location, with the same name, and/or the same icon as a target BI Artifact that has been identified for reduction. In one implementation, the SI System may utilize web services exposed by a Cognos Analytics based BI Environment to programmatically replace a target BI Artifact in the BI Environment with SI System created URL object used as the associated stand-in. The URL object may be created in such a way that it has the same name, is in the same location and/or displays the same icon as the target BI Artifact that has been identified for reduction. The URL object may be provisioned in such a way that the normal "activation" gesture that a user would use to execute the BI Artifact instead results in an activation event being directed to the SI System. In response to the activation event, the SI System may take a variety of actions, depending on the current state of the decommissioned BI Artifact. For example, if the decommissioned BI Artifact is in state 420 ("Stand-In: Just in Time Restore"), the SI System may retrieve the latest version of the decommissioned BI Artifact from a configured version control repository, utilize the Cognos web services API to silently restore this version of the BI Artifact back into the live BI Environment (replacing the stand-in), then redirect the activation event in such a way as to cause the restored BI Artifact to be executed. If the decommissioned BI Artifact is in state 430 or 440, the SI System may instead respond to the activation event by rendering an SI System generated web page, that displays information about the decommissioned BI Artifact and its current state in the decommissioning process (e.g., the screens described earlier in conjunction with the states depicted at 430 or 440). In another implementation, the SI System may provision the stand-in object as a specially configured SI System generated Cognos report that, when executed in the BI Environment, produces HTML report output that replays the activation event (or an equivalent) to the SI System, whereupon the SI System may take action based upon the state of the decommissioned BI Artifact, e.g., transparently restore the decommissioned BI Artifact and redirect the activation event back to the restored BI Artifact (state 420), or render an SI System generated web page with information about the decommissioned BI Artifact (state 430 or state 440). In some implementations, the SI System may store BI Artifacts in a memory associated with the SI System, in a configured version control repository 110 and/or in a long-term archival location 120. In some implementations, the SI System may retrieve BI Artifacts from a memory associated with the SI System, a configured version control repository 110 and/or from a long-term archive location 120.

In various implementations, specific BI ecosystem(s), BI environment(s), BI artifact(s), BI artifact properties(s), BI outputs, etc. may have been described. However, the described system(s) and process(es) may be utilized with a variety of BI ecosystem(s), BI environment(s), BI artifact(s), BI artifact properties, and/or BI outputs. For example, an IBM Cognos BI environment and/or various components of the IBM Cognos BI have been described in various implementations as examples; however, other types of BI environments and/or components of other types of BI environments may be utilized in the described systems and processes. In some materials, "Business Intelligence" may also be referred to as "Business Analytics" or "Analytics" (e.g., beginning with version 11, IBM Cognos Business Intelligences was renamed to IBM Cognos Analytics). Although some example implementations described herein utilize Cognos Reports (a type of BI Artifact), Cognos Report Specifications (a type of BI Artifact Specification) and Cognos Report Outputs (a type of BI Artifact Output) for illustrative purposes, the system(s) and process(es) described herein are equally applicable to many types of BI Artifacts, BI Artifact specifications and BI Artifact Outputs. By way of example, but not limitation, the described system(s) and process(es) may be applied to BI environments that are comprised of and/or utilize a wide variety Business Intelligence, Business Analytics, and/or Enterprise Planning software, including Cognos Business Intelligence, Cognos Analytics, Cognos TM1, Business Objects, MicroStrategy, QlikView, Qlik Sense, Tableau, Microsoft SQL Server Reporting and/or Analysis Services, Microsoft Power BI, Tibco Spotfire, etc. The described systems and process(es) may be applied to a wide variety of BI Artifact types, by way of example but not limitation, these BI Artifact types may include Cognos Reports, Analyses, Queries, Dashboards, Stories and Active Reports; SAP Business Objects Reports and WEBI documents, Tableau Workbooks, Sheets and Views, Qlik Applications, Sheets and Reports; SSRS Reports, Power BI Reports and Dashboards; Microstrategy Reports; etc.

The foregoing conditions for determining BI artifact decommissioning are set forth by way of example only. It is to be understood that one of ordinary skill in the art may set any manner and variety of decommissioning conditions without departing from the spirit and scope of the present disclosure.

Glossary Of Selected Terms

While dictionary meanings are also implied by certain terms used herein, the following glossary of certain terms may be useful.

"Business Intelligence", which is also known by the acronym "BI", generally refers to computer-based techniques used in identifying, extracting, and/or analyzing business data. BI is a set of methodologies, processes, architectures, and/or technologies that transform raw data into meaningful and useful information used to enable more effective strategic, tactical, and operational insights and decision-making. BI technologies may provide historical, current, and/or predictive views of business operations. Common functions of BI technologies include online analytical processing, analytics, data mining, process mining, complex event processing, business performance management, benchmarking, text mining, predictive analytics, and reporting. While BI and competitive intelligence both support decision making, BI may use technologies, processes, and applications to analyze mostly internal, structured data and business processes while competitive intelligence gathers, analyzes and disseminates information with a topical focus on company competitors. Accordingly, BI can be broadly understood to include competitive intelligence as a subset thereof.

"Business Intelligence software" means software that provides BI functionality. Commercially available BI software includes: IBM Cognos® available from IBM Corporation Armonk, N.Y.); SAP Business Objects® available form SAP AG (Walldorf, Germany); MicroStrategy® available from MicroStrategy (Tysons Corner, Va.); QlikView® available from QlikTech (Radnor, Pa.), and others.

"Business Intelligence environment" means a single instance of the BI software, installed on one or more computers. The instance may be made up of many processes that may coordinate together in some fashion to provide BI functionality to a set of users. The instance may host content such as BI artifacts, and may provide insight into one or more datasources (generally abstracted by one or more BI metadata layers). Many organizations will have multiple BI environments that are targeted toward different purposes, for example:

Development—A BI environment where BI developers create or update BI content (e.g., BI artifacts). The content in this type of environment is not yet published to users.

QA—A BI environment where quality assurance ("QA") professionals (also known as testers) verify the proper functioning of BI artifacts. Developers usually build out new versions of BI content in the development environment and then, at periodic checkpoints, promote that BI content from the development BI environment into the QA BI environment so that it can be tested.

Production—A "live" BI environment where end users are reviewing, analyzing, and using the BI content. BI content is not generally created or updated in this type of environment. Tested BI content is typically promoted from the QA BI environment into the production environment once it has passed through the organization's quality assurance processes.

"Business Intelligence ecosystem" means the entirety of the BI system, including the BI environment, the BI artifacts, metadata models, and configuration details contained within the BI environment or authored for the purpose of being deployed in that environment, the BI-accessible datasources utilized by the BI environment, the ETL (extract, transform, load) processes that push data into BI-accessible datasources, the upstream datasources from which the ETL processes pull data, and the computer(s) that host all of these components.

"Business Intelligence artifact" is a generic categorization for an authored BI object that resides in a BI environment and may be accessed by users (typically by utilizing the BI artifact to expose BI data from one or more datasources). Examples of BI artifacts in the context of IBM Cognos® include reports, metadata models, queries, analyses, dashboards, and business insight advanced objects, among others. Certain properties may be common to many types of BI artifacts, including: name; description; policy set (security policies); and screentip.

"Aspects of a BI artifact" (or "relevant aspects of a BI artifact") is a generic term for certain characteristics of a BI artifact (or related objects) that may be measured (and later improved) by the systems and processes of the present disclosure. Examples of aspects of a BI artifact may include, but are not limited to:

Execution time—how fast the BI environment can successfully execute the BI artifact (to produce one or more BI outputs) for a given set of artifact execution inputs;

Efficiency—a measure of the amount of load and/or resources consumed in the BI Environment by execution of the BI artifact for a given set of artifact execution inputs;

Properties of generated output—for example, the size of, the rendering complexity of, or the accuracy of data in a BI output generated by successful execution of the BI artifact in the BI Environment for a given set of artifact execution inputs. The rendering complexity of a generated BI output refers to the amount of resources consumed by viewing the BI output (e.g., a more complex BI output may cause greater system load when being rendered for viewing in a PDF viewer, a web browser, Microsoft Excel or other types of BI output viewers, whereas a simpler or more efficient BI output may convey the same or similar visual information with far less load when rendered in the same viewer);

Manageability—a measure regarding the succinctness, cleanliness and/or elegance of the BI artifact's specification (e.g., remove unnecessary complexity, remove redundancy, remove unused or left-over queries, and/or simplify logic). This aspect may be measured without executing the BI artifact;

Consistency—how closely the BI artifact adheres to an associated set of standards. This aspect may be measured without executing the BI artifact;

Correctness—the system may cross-reference certain data elements presented in a BI Output with related data elements from a BI-accessible data source and/or an upstream data source; and Redundancy—when considering multiple BI artifacts, how redundant is the BI artifact (e.g., a report that is substantially similar to several other considered BI artifacts would have a high redundancy score). This aspect may be measured without executing the BI artifact.

"BI Artifact Specification" is one property of a BI Artifact. A BI Artifact Specification may have a variety of purposes depending on the type of BI Artifact, for example. As an example, the BI Artifact specification may describe to the BI software how one or more data sources should be queried; how intermediate data (e.g., such as intermediate reports) should be summarized, post-processed, and potentially merged with other datasets; and/or how the resultant datasets should be rendered visually. BI Artifact specifications may be authored within an editing tool provided by the vendor of the BI software (or by some other means such as a text editor). A BI Artifact specification may encode most, if not all, of the information necessary for a BI system to service a BI artifact execution request. In some implementations, other properties, such as the associated metadata model or security policies, may be recorded as other properties on the BI Artifact itself. Concrete examples of BI artifact specifications include report specifications, analysis object specifications, query object specifications, interactive report specifications, etc.

"BI Output" means output produced by the successful execution of BI artifact(s) in the BI environment. End Users may execute a BI Artifact in the BI Environment to produce one or more BI outputs. In some implementations, an output may include, but is not limited to, a variety of information presented (e.g., on a presentation device, on paper, etc.) in a variety of forms, such as electronic file(s) and/or streams of data. The BI Output may be generated in a format (e.g., PDF, HTML, MHTML, CSV, Excel, Flash, Javascript, XML and/or other suitable formats) designated by the User and/or the system (e.g., the system may retrieve the format). In the case of web oriented BI Outputs (e.g., HTML, XHTML, MHTML and/or other suitable formats), the BI output file may contain references to other external resources (e.g., css files, javascript files, static images, dynamic images for charts and/or other visualizations, and/or vector graphics). Examples of BI Outputs may include a report output, metrics output, query object output, active report output, event output, analysis object output, dashboard output, and/or business insight advanced object output. Certain properties may be common to many types of BI artifacts, including, but not limited to: name; description; policy set (security policies); specification and/or screentip, in some implementations. As a non-limiting example, in IBM Cognos®, an analysis object is a type of BI artifact. Analysis objects may be authored in Analysis Studio by a User of the BI Environment (their specification is created/edited in Analysis Studio). A User may then execute the analysis object in the BI Environment (an example of an artifact execution request) with a given set of inputs (the artifact execution inputs) to produce a BI output (e.g., a PDF or HTML file which provides a rendering of data from one or more BI data sources which are exposed by the analysis object, often times through a metadata model). A non-limiting exemplary representation of these relationships is depicted graphically in FIGS. 4A and 4B. Although a specific report output has been described, the described system(s) and process(es) may be utilized with a variety of different types of report outputs.

"Metadata model" means a BI abstraction layer that sits on top of one or more physical or virtualized datasources (a virtualized datasource is achieved using software that makes multiple physical datasources appear as a single datasource). The metadata model typically provides a relatively user- and business-friendly view of the underlying datasources, and may also record various properties and categorizations for individual or derived data elements. A small sampling of what can be defined in a metadata model includes: (a) certain data elements may be categorized into dimensional hierarchies (for example, a geographic hierarchy, a product hierarchy, a time-based hierarchy (year>month>day>hour>second), among others); (b) aggregation rules or "roll up" behavior may be defined for the facts or measures; (c) row level security strategies may be implemented; and (d) internationalization strategies for the data may be implemented. Most BI artifacts in a system are dependent upon a metadata model—in other words, such BI artifacts are typically written in terms of an associated metadata model, and when executed in a BI environment, the combination of supplied execution inputs, the security identity, the BI artifact and the associated metadata model are utilized by the BI software to query, summarize, post-process and render visualizations of data in the underlying datasources.

"Report" is a type of BI artifact. The successful execution of a report in the BI environment will produce one or more report outputs. A report typically has many properties, including: name; description; policy set (security policies); screentip; specification (also known as report specification); associated metadata model; and others. A report is linked with a specific metadata model and this linkage may be specified as a property on the report (or, optionally, in the report specification).

"Report specification" is one property of a report. It describes to the BI software how one or more datasources should be queried (most often through references to abstractions defined in the metadata model); how intermediate result sets should be summarized, post-processed, and potentially merged with other datasets; and how the resultant datasets should be rendered visually. Report specifications are typically authored within an editing tool provided by the vendor of the BI software (e.g., in IBM Cognos®, report specifications are edited in Report Studio). A report specification often encodes most, if not all, of the information necessary for a BI system to service an execution request (although other properties such as the associated metadata model or security policies may be recorded as other properties on the report itself).

"Report output" means an output produced by the execution of a report or a report specification. A report output is typically one or more electronic files in a format selected by a user (e.g., PDF, HTML, CSV, and/or Excel, among others). In the case of web oriented report outputs (e.g., HTML, XHTML, or other suitable programming language), the report output file may contain references to other external resources (e.g., css files, JavaScript files, static images, dynamic images for charts or other visualizations, vector graphics, etc.).

The invention claimed is:

1. A method for managing storage of business intelligence artifacts in a business intelligence environment, comprising the steps of:
    communicably coupling a supplemental system operating on a first computer system to the business intelligence environment operating on a second computer system, the supplemental system performing the steps of:
        monitoring, via one or more system agents of the supplemental system, the business intelligence environment;
        analyzing a usage pattern, a revision history, or a combination thereof of one or more business intelligence artifacts in the business intelligence environment;
        generating a classification for a business intelligence artifact in the business intelligence environment based on the analysis and a classifier from a configurable set of classifiers;
        recording, in a memory associated with the supplemental system, the generated classification in a classification history for the business intelligence artifact;
        determining, based on the classification and the classification history, whether the business intelligence artifact is a target artifact to be decommissioned; and
        if the business intelligence artifact is determined to be a target artifact, then automatically sending a control signal to the business intelligence environment to initiate a decommissioning process on the target artifact to improve the business intelligence environment by reducing its maintenance footprint; and
        if the business intelligence artifact is determined not to be a target artifact, then maintaining the business intelligence artifact in a live, active state in the business intelligence environment.

2. The method of claim 1, wherein the classifier is an essentiality classifier.

3. The method of claim 2, wherein generating the classification comprises:
    examining historical classifications of the business intelligence artifact generated by one or more other classifiers.

4. The method of claim 2, wherein the generated classification is one of a plurality of grades of essentiality, including a non-essential grade.

5. The method of claim 4, wherein if the generated classification remains in the non-essential grade for a period of time, the decommissioning process is initiated on the target artifact.

6. The method of claim 1, wherein the classifier is selected from a list comprising:
    a complexity classifier, a volatility classifier, a usage classifier, a logical correctness classifier, a performance classifier, a load classifier, a redundancy classifier, an essentiality classifier, or any combination thereof.

7. The method of claim 1, further comprising:
    generating one or more additional classifications for the business intelligence artifact.

8. The method of claim 7, wherein the generating one or more additional classifications occurs at periodic intervals to develop a classification history for the business intelligence artifact.

9. The method of claim 1, wherein the decommissioning process comprises:
    replacing the target artifact with a stand-in object in the business intelligence environment;
    wherein the stand-in object is generated by the supplemental system.

10. The method of claim 9, wherein the decommissioning process further comprises:
    the supplemental system generating one or more additional classifications based on the classifier at periodic intervals to develop a classification history for the target artifact.

11. The method of claim 10, wherein the generated additional classification is one of a plurality of classification grades.

12. The method of claim 11, wherein the decommissioning process further comprises the supplemental system performing the steps of:
    monitoring the classification history of the target artifact to determine a change in its classification; and
    replacing the stand-in object with its associated target artifact in the business intelligence environment if the classification grade of the target artifact improves.

13. The method of claim 11, wherein the decommissioning process further comprises the supplemental system performing the steps of:
    monitoring the classification history of the target artifact to determine a change in its classification; and
    progressing the target artifact to one or more further stages of decommissioning if the classification grade of the target artifact declines or remains unchanged.

14. The method of claim 13, wherein the one or more further stages of decommissioning comprises:
    the supplemental system removing the stand-in object from the business intelligence environment.

15. The method of claim 14, wherein the one or more further stages of decommissioning comprises:
    the supplemental system maintaining one or more versions of the target artifact in a version control repository.

16. The method of claim 15, wherein the one or more further stages of decommissioning comprises:
    the supplemental system transitioning the target artifact from the version control repository to archived storage after a pre-determined period of time.

17. The method of claim 16, wherein the one or more further stages of decommissioning comprises:
    the supplemental system purging the target artifact from the archived storage after a second pre-determined period of time.

18. The method of claim 15, wherein the decommissioning process further comprises the supplemental system performing the steps of:
    retrieving the target artifact from the version control repository; and
    restoring the target artifact to the business intelligence environment.

19. The method of claim 9, wherein the decommissioning process further comprises:
    the supplemental system restoring the target artifact to the business intelligence environment if an attempt is made to access the target artifact via the stand-in.

20. The method of claim 9, wherein the decommissioning process further comprises:
    the supplemental system restoring the target artifact to the business intelligence environment in response to a user request.

21. The method of claim 9, wherein the decommissioning process further comprises the supplemental system performing the steps of:
    determining whether or not to restore the target artifact to the business intelligence environment in response to a user request; and
    restoring the target artifact to the business intelligence environment if the request is approved.

22. A method for managing storage of business intelligence artifacts in a business intelligence environment, comprising the steps of:
    communicably coupling a supplemental system to the business intelligence environment, the supplemental system performing the steps of:
        monitoring, via one or more system agents of the supplemental system, the business intelligence environment;
        determining a classification for a business intelligence artifact in the business intelligence environment based on a classifier from a configurable set of classifiers;
        recording, in a memory associated with the supplemental system, the generated classification in a classification history for the business intelligence artifact;
        determining, based on the classification and the classification history, whether the business intelligence artifact is a target artifact to be decommissioned;
        if the business intelligence artifact is determined to be a target artifact, then decommissioning the target artifact by generating a stand-in object and replacing the target artifact with the stand-in object;
        if the business intelligence artifact is determined not to be a target artifact, then maintaining the business intelligence artifact in a live, active state in the business intelligence environment;
        if a user attempts to use the stand-in object, then generating a message to the user;
        transmitting the message to the user;
        obtaining input from the user, via the message, about whether to restore the target artifact to a live, active state in the business intelligence environment;
        if the user input is to restore the target artifact, then placing the target artifact into a live, active state in the business intelligence environment and deleting the stand-in object; and
        if the user input is not to restore the target artifact, then maintaining the stand-in object in the business intelligence environment.

* * * * *